United States Patent [19]

Kviesitis

[11] Patent Number: 5,583,165

[45] Date of Patent: Dec. 10, 1996

[54] TOP DRESSING FOR GARDENS AND LAWNS

[75] Inventor: Boris Kviesitis, Des Moines, Iowa

[73] Assignee: True Pitch, Inc., Altoona, Iowa

[21] Appl. No.: 505,129

[22] Filed: Jul. 21, 1995

[51] Int. Cl.$^6$ .............. C09K 7/00; C08K 11/00; C08L 89/00; C05F 1/00

[52] U.S. Cl. ............... 523/131; 524/9; 524/28; 524/55; 524/261; 524/312; 524/446; 524/442; 524/492; 106/287.17; 106/900; 427/218; 427/219; 427/220; 427/221; 427/214; 428/404; 428/407; 71/16; 71/903

[58] Field of Search ............... 524/312, 446, 524/55, 261, 28, 9, 442, 492; 523/131; 106/287.17, 900; 427/218, 219, 220, 221, 214; 428/404, 407; 71/16, 903

[56] References Cited

U.S. PATENT DOCUMENTS

| | | | |
|---|---|---|---|
| 2,652,379 | 9/1953 | Hedrick et al. | 106/900 |
| 3,887,506 | 6/1975 | Hewitt | 404/75 |
| 4,125,392 | 11/1978 | Primo | 71/3 |
| 4,666,497 | 5/1987 | Tenzer | 71/6 |
| 4,792,133 | 12/1988 | Hawkins et al. | 472/86 |
| 4,819,933 | 4/1989 | Armond | 472/92 |
| 4,852,870 | 8/1989 | Hawkins et al. | 472/92 |
| 4,968,024 | 11/1990 | Hawkins | 472/86 |
| 5,151,123 | 9/1992 | Kviesitis | 106/287.17 |
| 5,254,364 | 10/1993 | Kviesitis | 427/214 |
| 5,264,029 | 11/1993 | Kviesitis | 106/287.17 |

FOREIGN PATENT DOCUMENTS

| | | | |
|---|---|---|---|
| 52-21129 | 2/1977 | Japan | 405/264 |
| 56-10584 | 2/1981 | Japan . | |
| 57-102959 | 6/1982 | Japan | 427/221 |
| 58-11729 | 1/1983 | Japan . | |
| 61-44990 | 3/1986 | Japan | 405/264 |

Primary Examiner—Paul R. Michl
Assistant Examiner—LaVonda R. DeWitt
Attorney, Agent, or Firm—Zarley, McKee, Thomte, Voorhees, & Sease

[57] ABSTRACT

A soil top dressing is comprised of a mixture of sand, clay, a plasticizer material, water, and a coloring pigment, if desired. The components of the soil composition are preferably present in the following proportions by weight: sand 50–70%; clay 10–40%; plasticizer 0.5–5.0%; water 5–20%; coloring pigment 1–5%; all coated with kelp meal granules (5–20%). The method of making the invention involves continuously mixing a portion of the sand and the plasticizer in an agitation mixer. The sand becomes coated with the plasticizer, whereupon a quantity of clay is then added, followed by an additional portion of the plasticizing material. It is particularly important that the sand particles become coated with the plasticizing compound and clay. The coloring pigments are added and mixed thereafter. The foregoing particles are thereupon coated with particles of kelp meal. As soon as complete mixing takes place, material can be immediately transferred from the mixer to suitable packaging.

25 Claims, No Drawings

TOP DRESSING FOR GARDENS AND LAWNS

BACKGROUND OF THE INVENTION

This invention is an improvement over the subject matter of U.S. Pat. Nos. 5,151,123; 5,254,364 and 5,264,029. These patents relate to a soil composition comprised of clay-coated sand particles. It has been discovered that the material of these patents is an excellent carrier for the well known fertilizer, kelp meal.

Kelp is seaweed harvested from ocean waters, and which has high nutritive plant food benefits. Kelp meal is kelp ground into granules, and is useful on lawns and gardens to restore depleted minerals—nutrients like calcium, sulfur, iron, magnesium and trace minerals which are often lacking in existing fertilizers.

However, handling and spreading kelp meal is not always easy because it is not free flowing. In addition, it is difficult to mix kelp meal with a carrier because the kelp granules tend to separate from the carrier which results in a non-uniform product. Further, rain tends to separate the kelp meal from the carrier, which also results in non-uniform coverage.

It is therefore a principal object of this invention to provide a top dressing for soils that combines kelp meal with a suitable carrier wherein the particles of kelp meal will not separate from the carrier during mixing, storage, application or in the presence of rain after application to the soil.

A further object of this invention is to provide a top dressing for soils that combines kelp meal with a suitable carrier which will be a free flowing product.

These and other objects will be apparent to those skilled in the art.

SUMMARY OF THE INVENTION

A top dressing for soil comprising a quantity of kelp meal granules mixed with sand, clay, a plasticizer and water wherein the particles of kelp meal coat the particles of sand and clay. A typical composition would consist of the following proportions (by weight) of various ingredients:

| | |
|---|---|
| Sand: | 50–70% |
| Polyvinyl Alcohol: | 0.5–5.0% |
| Glycerol | 0.2–3.0% |
| Water: | 5–20% |
| Clay: | 10–40% |
| Coloring Pigment: | 1–5% |
| Urea | 0.5–1% |
| Kelp meal | 5–20% |

More specifically, the soil carrier of this invention is comprised of a mixture of sand, clay, a plasticizer material, water, and a coloring pigment, if desired. The components of the soil carrier are preferably present in the following proportions by weight: sand 50–70%; clay 10–40%; plasticizer 0.5–5.0%; water 5–20%; and coloring pigment 1–5%.

The method of making the invention involves continuously mixing a portion of the sand and the plasticizer in an agitation mixer. The sand becomes coated with the plasticizer, whereupon a quantity of clay is then added, followed by an additional portion of the plasticizer material. It is particularly important that the sand particles become coated with the plasticizing compound and clay. The coloring pigments are added and mixed thereafter. The kelp meal is added at the end of the mixing cycle so as to cling to the carrier particles. As soon as complete mixing takes place, the material can be immediately transferred from the mixer to suitable packaging.

DESCRIPTION OF THE PREFERRED EMBODIMENT

The following tables show the preferred ingredients by weight of the top dressing of this invention.

TABLE I

| Ingredient | Range | Preferred |
|---|---|---|
| Sand (Silicon Dioxide) | 50–70% | 60.0% |
| Polymer (Polyvinyl Alcohol) | 0.5–5.0% | 1.0% |
| Water ($H_2O$) | 5–20% | 11.0% |
| Clay (Hydrated Aluminum Silicate) | 10–40% | 26.0% |
| Coloring Pigment | 1–5% | 2.0% |
| Urea ($NH_2$)$_2$ CO | 0.5%–1.0% | 0.5% |
| Kelp Meal (Ascophyllum Nodosum) | 5–20% | 9.5% |

TABLE II

| Ingredient | Range | Preferred |
|---|---|---|
| Sand (Silicon Dioxide) | 50–70% | 60.0% |
| Polymer (Polyvinyl Alcohol) | 0.6–5.0% | 1.0% |
| Glycerol (Plasticizer) | 0.2–3.0% | 0.5% |
| Water ($H_2O$) | 5–20% | 11.0% |
| Clay (Hydrated Aluminum Silicate) | 10–40% | 25.5% |
| Coloring Pigment | 1–5% | 2.0% |
| Urea ($NH_2$)$_2$ CO | 0.5%–1.0% | 0.5% |
| Kelp Meal (Ascophyllum Nodosum) | 5–20% | 9.5% |

TABLE III

| Ingredient | Range | Preferred |
|---|---|---|
| Sand | 50–70% | 62.0% |
| Polymer (Polyvinyl Alcohol) | 0.4–5.0% | 0.4% |
| Glycerol (Plasticizer) | 0.2–3.0% | 0.2% |
| Water ($H_2O$) | 5–20% | 5.7% |
| Clay (Hydrated Aluminum Silicate) | 10–40% | 19.2% |
| Coloring Pigment | 1–5% | 2.5% |
| Urea ($NH_2$)$_2$ CO | 0.5%–1.0% | 0.5% |
| Kelp Meal (Ascophyllum Nodosum) | 5–20% | 9.5% |
| Total: | | 100.0% |

Typical mixing formulations are shown in the following tables:

TABLE IV

| | |
|---|---|
| Sand | 975 lbs. |
| Clay | 450 lbs. |
| Iron Oxide | 60 lbs. |
| Binder | 120 lbs. |
| Urea | 8 lbs. |
| Kelp Meal | 150 lbs. |
| Total: | 1,763 lbs. |

TABLE V

| | |
|---|---|
| Sand | 975 lbs. |
| Clay | 300 lbs. |

TABLE V-continued

| | |
|---|---|
| Iron Oxide | 40 lbs. |
| Binder | 90 lbs. |
| Urea | 8 lbs. |
| Kelp Meal | 150 lbs. |
| Total: | 1,563 lbs. |

Polyvinyl Alcohol could be added or substituted with other polymers which possess plasticizing properties. Other suitable polymers would be polyvinyl acetate, polyvinyl chloride, or natural or synthetic rubber latex.

The method of making the top dressing of this invention involves continuously mixing the polyvinyl alcohol with water in the proportions indicated to create a plasticizer in the form of a viscous-like substance. A quantity of sand is introduced into an agitation mixer, and a portion of the urea is introduced into the mixer to mix with the sand. A portion of the plasticizer is introduced into the mixer to coat the sand and urea. A portion of clay is then introduced into the mixer, whereupon plasticizer, and clay are introduced in turn in accordance with the above proportion to complete the composition. Care should be exercised to introduce the plasticizer following the introduction of additional clay so that sand particles can be coated with both the plasticizer and clay. A portion of the coloring substance is added into the mixture and mixing continues. Finally, the specified quantity of the kelp meal is added to coat the particles of the sand and clay.

The use of urea is helpful but not critical. It is added when the sand is provided to provide uniform particles. The urea acts as a hardening agent because it reacts chemically with the polyvinyl alcohol. The urea also enhances the nutrients of the kelp meal by permitting the kelp to act more quickly, i.e., to release nutrients more quickly. The resulting product is more active when urea is used.

The resulting product can be used for soil maintenance purposes on gardens or lawns either as a top dressing, or by mixing it with the soil. The presence of the kelp meal will stimulate biological activities of the soil bacteria and will stimulate the plants utilization of fertilizers, humus, and other soil elements.

It is therefore seen that the invention will accomplish at least all of its stated objectives.

What is claimed is:

1. A soil top dressing, resulting from the method of:

taking a quantity of sand comprised of a plurality of sand particles;

coating said sand particles with a liquid plasticizer material comprised of a mixture of water and at least one from the group of polyvinyl alcohol, polyvinyl acetate, silicon rubber latex or glycerol, adding a quantity of clay comprised of a plurality of clay particles, along with a second quantity of said plasticizer material to said coated sand particles, and adding a quantity of kelp to coat said sand coated particles.

2. The composition of claim 1 wherein said quantity of kelp is granulated kelp meal.

3. The composition of claim 1 wherein said plasticizer material is a mixture of polyvinyl alcohol and water.

4. The composition of claim 2 wherein said sand comprises 50–70% by weight of said composition; said clay comprises 10–40% by weight of said composition; said polyvinyl alcohol comprises 0.5–5% by weight of said composition; and said water comprises 5–20% by weight of said composition.

5. The composition of claim 2 wherein a quantity of glycerol comprises a part of said composition.

6. The composition of claim 1 wherein a coloring pigment comprises a part of said composition.

7. The composition of claim 1 wherein said sand comprises approximately 60% by weight of said composition, said clay comprises approximately 20% by weight of said composition; said polyvinyl alcohol comprises approximately 0.4% by weight of said composition; and said water comprises approximately 6% by weight of said composition.

8. The composition of claim 1 wherein said plasticizer material constitutes between 0.2–3% by weight of said composition.

9. The composition of claim 8 wherein said composition consists essentially of 50–70% by weight of said sand: 10–40% by weight of said clay; 0.2–3% by weight of said plasticizer material; and 5–20% by weight of water.

10. The composition of claim 1 wherein said composition consists of 50–70% by weight of sand; 10–40% by weight of said clay; 0.2–3% by weight of said plasticizer material; and 5–20% by weight of water.

11. The composition of claim 1 wherein said composition consists essentially of 50–60% by weight of sand; 10–40% by weight of said clay; 0.2–3.0% by weight of said plasticizer material; and 5–20% by weight of water.

12. The composition of claim 1 wherein said composition consists of 50–60% by weight of said sand; 10–40% by weight of clay; 0.2–3.0% by weight of said plasticizer material; and 5–40% by weight of water.

13. The composition of claim 1 wherein said composition includes 0.5–1.0% by weight of urea.

14. The composition of claim 1 wherein said composition comprises 5–20% by weight of said kelp.

15. The composition of claim 1 where said composition comprises approximately 9.5% by weight of said kelp.

16. A soil top dressing, resulting from a method of taking a quantity of sand comprised of sand particles; coating said sand particles with a premixed liquid plasticizer material comprised of polyvinyl alcohol, polyvinyl acetate, rubber latex and glycerol;

adding a quantity of clay to the coated sand particles to form a coating of said clay on the coated sand particles;

adding an additional outer coating of the premixed liquid plasticizer on top of the sand particles coated with the coating of said clay; and coating said aforementioned composition with a kelp material.

17. The composition of claim 16 wherein said kelp material is kelp meal.

18. A method of making a top dressing material for soil, comprising, a) placing sand particles in an agitation mixer;

b) adding to said sand particles at least one coating material selected from the group consisting of polyvinyl alcohol, polyvinyl acetate, polyvinyl chloride, natural or synthetic rubber latex, and glycerol to form a coating on said sand particles;

c) adding clay to said agitation mixer to form a coating of clay on said sand particles coated in step b); and d) coating said aforementioned composition with a kelp material.

19. The composition of claim 18 wherein said kelp material is kelp meal.

20. The method of claim 1 wherein said liquid plasticizer material is a mixture of polyvinyl alcohol and water.

21. The method of claim 1 wherein said sand, clay, and said liquid plasticizer material comprise the following approximate respective proportions by weight of said composition: 62%, 20%; 0.5%; with water comprising at least approximately 6% by weight of said composition.

22. The method of claim 1 wherein said sand, said clay, and said liquid plastizer material comprises the following respective portions by weight of said composition: 50–70%; 10–40%; 0.5–5%; with water comprising approximately 5–20% by weight of said composition.

23. The method of claim 1 wherein pigment is added to said composition.

24. The method of claim 18 wherein said kelp material comprises between 5–20% by weight of said top dressing material.

25. The method of claim 18 wherein said kelp material comprises approximately 10% by weight of said top dressing material.

* * * * *